UNITED STATES PATENT OFFICE.

JOSEPH A. AMBLER, OF NORWICH, CONNECTICUT, AND HARRY D. GIBBS, OF SAN FRANCISCO, CALIFORNIA.

PROCESS FOR THE MANUFACTURE OF AROMATIC SULFONIC ACIDS.

1,300,227.  Specification of Letters Patent.  Patented Apr. 8, 1919.

No Drawing.  Application filed January 16, 1918. Serial No. 212,101.

(DEDICATED TO THE PUBLIC.)

*To all whom it may concern:*

Be it known that we, JOSEPH A. AMBLER and HARRY D. GIBBS, citizens of the United States of America, employees of the Department of Agriculture of the said United States, residing, respectively, in the city of Norwich, county of New London, State of Connecticut, and in the city of San Francisco, county of San Francisco, State of California, whose post-office address is Washington, D. C., have jointly invented a new and useful Process for the Manufacture of Aromatic Sulfonic Acids.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon. This invention is dedicated to the free use of the people of the United States.

Heretofore various methods have been employed for the production of the aromatic sulfonic acids, among which are the following:

1. By adding the aromatic hydrocarbons to an excess of sulfuric acid or of sulfuric acid containing sulfur trioxid and mixing them together by various means at different temperatures. The products vary with the strength of the acid used, the temperature, and the duration of heating.

2. By passing the vapors of the hydrocarbons into a vessel of sulfuric acid heated to the proper temperature.

In both of these methods the products remain in the hot reaction vessel for a considerable length of time and hence the initial products may be changed, as is well known, more or less completely into isomeric substances, which are often of less value than the initial, more unstable forms, this being a type of reaction which is promoted by long heating in the presence of an excess of hot sulfuric acid.

We have found that when vapors of the aromatic hydrocarbons are passed up through a descending stream of sulfuric acid under the proper conditions of temperature and rate of flow, the vapors are absorbed by the acid with the formation of water and sulfonic acids of the aromatic hydrocarbon used. The latter are quickly carried downward and may be removed from the heated reaction vessel in a very few minutes after they are formed, and thus are not subjected to prolonged heating with excess sulfuric acid, for which reason the transformation into isomeric acids does not take place to as large an extent as in the older methods. Furthermore, the amount of sulfuric acid required is found to be often less than in the other methods. Thus, our invention is an improvement on the known processes of sulfonation, in that it affords a continuous and almost instantaneous method of sulfonation, and also in that it generally uses less sulfuric acid, any excess of which is lost in the later separation of the salts of the sulfonic acids.

We shall illustrate our invention by describing the process for making a sulfonic acid of an aromatic hydrocarbon, for example, toluene, although the invention is not restricted to the making of the sulfonic acids of this particular hydrocarbon. In other co-pending applications we have described and claimed our invention in connection with the making of other specific sulfonic acids.

Sulfuric acid of specific gravity of 1.84 is caused to flow down through a tower, constructed of iron or some inert material, which contains baffle plates or pebbles or coarse pumice stones and which is heated and maintained at a suitable temperature. The temperature is the same or greater than that at which the hydrocarbon boils, for example, 111° centigrade or greater, in the sulfonation of toluene and this temperature varies above the boiling point of the hydrocarbon, for example, toluene, depending on the particular sulfonic acid desired. The vapors of the hydrocarbon, for example, toluene, are caused to enter at a point near or below the center of the tower and pass upward over the baffle plates, pebbles, or coarse pumice stones, which are wetted by the descending hot sulfuric acid. The vapors are absorbed by the acid, uniting with it to form water and sulfonic acids of the hydrocarbon, for example, toluene sulfonic acids. The water, owing to the high temperature of the reaction, 111° centigrade or above, when toluene is used, escapes from the tower in the form of steam which is led away and, together with any unattacked hydrocarbon, for example, toluene, condensed in a suitable condenser attached to the top of the tower. The sulfonic acids, for example, toluene sulfonic acids, as soon as formed are washed downward by the descending sulfuric acid and are discharged, together with any excess sulfuric acid, from the bottom of the tower, which is closed by a liquid seal of the descending acids. In this way the products move in a continuous and automatic way and are discharged from the tower within a few minutes of their formation. This speedy removal tends to prevent the secondary transformations due to prolonged heating with excess sulfuric acid.

The rate of flow and the temperature at which the reaction takes place determine the particular sulfonic acid formed. The product formed, for example, when toluene is sulfonated at 150° centigrade consists of a mixture of the toluene monosulfonic acids, while when toluene is sulfonated at 240° to 250° centigrade, the product consists mainly of toluene-disulfonic acid, with an admixture of the monosulfonic acids.

The sulfonic acids produced, for example, toluene sulfonic acids, are then separated by well-known methods from the excess of sulfuric acid and then used in the manufacture of other valuable derivatives of the hydrocarbon, for example, cresols and cresol sulfonic acids.

It is obvious that concentrations of sulfuric acid other than that which has a specific gravity of 1.84, may be used, and the invention is not restricted to such acid of specific gravity 1.84, but has a general application to all concentrations of sulfuric acid.

It is also obvious that hydrocarbons other than toluene may be employed and the invention is not restricted to the use of toluene, but has a general application to the aromatic hydrocarbons.

Having thus described our invention, we claim—

1. A continuous process for the manufacture of sulfonic acids of aromatic hydrocarbons by causing the vapors of the hydrocarbon to mix with the vapors of sulfuric acid, and continuously removing in the vapor phase the unacted on aromatic hydrocarbons and the water formed, and also continuously removing in the liquid phase the excess of sulfuric acid and the aromatic sulfonic acids.

2. A continuous process for the manufacture of sulfonic acids of aromatic hydrocarbons by causing the vapors of the hydrocarbon to come into contact with a descending current of sulfuric acid, and continuously removing in the vapor phase the unacted on aromatic hydrocarbons and the water formed, and also continuously removing in the liquid phase the excess of sulfuric acid and the aromatic sulfonic acid.

3. A continuous process for the manufacture of sulfonic acids of aromatic hydrocarbons by causing the vapors of the hydrocarbon to come into contact with a descending current of sulfuric acid heated to the temperature at which the hydrocarbon boils, and continuously removing in the vapor phase the unacted on aromatic hydrocarbons and the water formed, and also continuously removing in the liquid phase the excess of sulfuric acid and the aromatic sulfonic acids.

4. A continuous process for the manufacture of sulfonic acids of the aromatic hydrocarbons by causing the vapors of the hydrocarbon to come into contact with a descending current of sulfuric acid heated to a temperature above that at which the hydrocarbon boils, and continuously removing in the vapor phase the unacted on aromatic hydrocarbons and the water formed, and also continuously removing in the liquid phase the excess of sulfuric acid and the aromatic sulfonic acids.

5. A continuous process for the manufacture of sulfonic acids of aromatic hydrocarbons by causing the vapors of the hydrocarbon to rise through a tower in which a stream of sulfuric acid is descending over obstructions to break and retard its fall, and continuously removing in the vapor phase the unacted on aromatic hydrocarbons and the water formed, and also continuously removing in the liquid phase the excess of sulfuric acid and the aromatic sulfonic acids.

6. A continuous process for the manufacture of sulfonic acids of aromatic hydrocarbons by causing the vapors of the hydrocarbons to rise through a tower in which a stream of sulfuric acid heated to the temperature at which the hydrocarbon boils is descending over obstructions to break and retard its fall, and continuously removing in the vapor phase the unacted on aromatic hydrocarbons and the water formed, and also continuously removing in the liquid phase the excess of sulfonic acid and the aromatic sulfonic acids.

7. A continuous process for the manufacture of sulfonic acids of aromatic hydrocarbons by causing the vapors of the hydrocarbon to rise through a tower in which a stream of sulfuric acid heated to a temperature above that at which the hydrocarbon boils is descending over obstructions to break and retard its fall, and continuously removing in the vapor phase the unacted on aromatic hydrocarbons and the water formed, and also continuously removing in the liquid phase the excess of sulfuric acid and the aromatic sulfonic acids.

In testimony whereof, we affix our signatures in the presence of two subscribing witnesses.

JOSEPH A. AMBLER.
HARRY D. GIBBS.

Witnesses:
 HAZEL WORDEMAN,
 LAURA A. SKINNER.